(12) United States Patent
Piazza et al.

(10) Patent No.: US 10,894,624 B2
(45) Date of Patent: Jan. 19, 2021

(54) LABELING APPARATUS FOR LABELING RECEPTACLES AND A METHOD FOR OPERATING SUCH A LABELING APPARATUS

(71) Applicant: Sidel Participations, Octeville-sur-mer (FR)

(72) Inventors: Gastone Piazza, Parma (IT); Cristian Andreato, Parma (IT); James Carmichael, Parma (IT); Raffaele Pace, Parma (IT)

(73) Assignee: Sidel Participations, Octeville-sur-mer (FR)

( * ) Notice: Subject to any disclaimer, the term of this patent is extended or adjusted under 35 U.S.C. 154(b) by 423 days.

(21) Appl. No.: 15/656,867

(22) Filed: Jul. 21, 2017

(65) Prior Publication Data

US 2018/0022495 A1   Jan. 25, 2018

(30) Foreign Application Priority Data

Jul. 22, 2016   (EP) ..................................... 16305947

(51) Int. Cl.
*B65C 9/42* (2006.01)
*B65C 9/22* (2006.01)
(Continued)

(52) U.S. Cl.
CPC ................ *B65C 9/42* (2013.01); *B08B 13/00* (2013.01); *B32B 1/02* (2013.01); *B32B 7/12* (2013.01);
(Continued)

(58) Field of Classification Search
CPC ........... B65C 9/00; B65C 9/18; B65C 9/1815; B65C 9/1819; B65C 9/1876; B65C 9/188; B65C 3/06; B65C 3/08; B65C 3/14; B65C 3/16; B65C 3/163; B65C 3/26; B65C 9/40; Y10T 156/1033; Y10T 156/1768; Y10T 156/1771; Y10T 156/1773; B65H 5/226;
(Continued)

(56) References Cited

U.S. PATENT DOCUMENTS 6,066,223 A * 5/2000 Gomes ...................... B65C 3/16
156/215
2017/0014875 A1 * 1/2017 Brower .................. A46B 13/00

FOREIGN PATENT DOCUMENTS

DE   296 255 A5   11/1991
EP   2 567 902 A1   3/2013
(Continued)

OTHER PUBLICATIONS

Extended European Search Report dated Jan. 19, 2017, 2 pages.

*Primary Examiner* — Carson Gross

(57) ABSTRACT

The present disclosure relates to a labeling apparatus for labeling articles. In one implementation, the apparatus may include a transfer drum having at least one label retaining segment adapted to receive and to retain at least one label, a glue application unit adapted to apply glue onto the label, a cleaning unit adapted to clean the transfer drum and a control unit adapted to selectively activate the cleaning unit into at least any one of: a partial cleaning configuration in which the cleaning unit is configured to partially clean the at least one label retaining segment or a full cleaning configuration in which the cleaning unit is configured to fully clean the at least one label retaining segment.

16 Claims, 4 Drawing Sheets

(51) Int. Cl.
 *B08B 13/00* (2006.01)
 *B32B 1/02* (2006.01)
 *B32B 7/12* (2006.01)
 *B32B 37/22* (2006.01)
 *B65C 9/18* (2006.01)
 *B65C 9/40* (2006.01)
 *B65C 9/00* (2006.01)

(52) U.S. Cl.
 CPC ............... *B32B 37/22* (2013.01); *B65C 9/18* (2013.01); *B65C 9/22* (2013.01); *B32B 2439/00* (2013.01); *B65C 9/40* (2013.01); *B65C 2009/0071* (2013.01)

(58) Field of Classification Search
 CPC ....... B65H 2406/33; B08B 1/002; B08B 1/04; B08B 13/00
 See application file for complete search history.

(56) References Cited

FOREIGN PATENT DOCUMENTS

| | | | |
|---|---|---|---|
| EP | 2 818 424 | A1 | 12/2014 |
| EP | 2818424 | A1 * | 12/2014 |
| EP | 3 072 824 | A1 | 9/2016 |
| WO | WO 2009/106128 | A1 | 9/2009 |

\* cited by examiner

LABELING APPARATUS FOR LABELING RECEPTACLES AND A METHOD FOR OPERATING SUCH A LABELING APPARATUS

This application claims priority to European Patent Application EP16305947.0, filed on Jul. 22, 2016, the contents of which are incorporated herein by reference in their entirety.

TECHNICAL FIELD

Embodiments of the present disclosure relate to a labeling apparatus for labeling articles and a method of operating such a labeling apparatus. In particular, embodiments of the present disclosure relate to a labeling apparatus for labeling receptacles, such as bottles, containers and the like.

BACKGROUND

The packaging of food or non-food products into respective articles, in particular receptacles, containers, bottles, etc., often include a labeling of the receptacles with respective label sheets during a labeling process. Typically, the label sheets serve, e.g., to transmit the respective brand of the packaged product and, thus, to draw the attention of final customers once the product has been delivered to and exposed in store houses. Additionally, each label sheet may provide the customer with important information about the stored product. The overall appearance of the label sheet applied on a respective article is often of significant importance. Thus, the quality of the labeling process itself should guarantee a correct, repeatable and clean attachment of the label. Otherwise, a significant number of articles may be discarded due to an unsatisfactory appearance of the applied label, which may lead to increasing production costs.

Labeling apparatuses for automatically attaching labels onto articles of all sort, such as receptacles, containers, vessels, bottles, etc., are generally in widespread use in the packaging industry.

One typical label type is the so-called "self-stick label", which is directly wrapped around at least part of the respective article and glued thereto.

In some labeling apparatuses, prior to the application of the labels onto the respective articles, the labels may be conveyed by means of a transfer drum.

In a labeling apparatus of the "self-stick label" type, which the following description will refer to without any limitative scope, each label of a succession of labels is attached onto the outer surface of one respective article. Prior to the application of the label onto the respective article glue is supplied onto the back surface of the label itself.

In these apparatuses, the articles are typically carried by a conveying carrousel along an article path to advance towards an application station at which one respective label is stuck onto each article. At the same time, a web of labeling material is fed from a roll-feeding unit towards a transfer drum.

For example, the web of labeling material may be advanced towards an outer lateral surface of the transfer drum. During feeding, the web of labeling material may be brought into contact with a cutter of a cutting unit to cut the web of labeling material into labels of defined and appropriate lengths. Then each label may be retained on the outer lateral surface of the transfer drum and may be conveyed, by rotation of the transfer drum around its axis, towards the application station.

For example, during transfer towards the application station, the labels may be retained by respective label retaining segments of the outer lateral surface of the transfer drum. These label retaining segments are often equally spaced angularly around the axis of the transfer drum and have respective retaining sections which retain the label typically by means of suction and respective transition sections, along which labels fed from the roll-feeding unit slide prior to reaching the respective retaining sections. Additionally, the label retaining segments often comprise a pair of pads protruding from the transfer drum, each one adapted to interact with a leading edge or a trailing edge of the labels and defining the retaining and transition sections.

Furthermore, prior to reaching the application station, each label may interact at a glue application station with a glue application unit which applies a pattern of glue onto the backside of the label so that the label can be stuck onto one respective article.

One common type of glue application unit comprises a rotating glue application roller tangentially cooperating with the transfer drum and adapted to contact the labels advanced by the transfer drum at the glue application station. Thereby, glue is transferred from the outer lateral surface of the glue application roller to the label. In particular, glue is transferred to the leading and trailing edges of the labels as, in use, the glue application roller contacts the labels solely at the position of the pads protruding from the outer lateral surface of the transfer drum.

Generally, during use of the labeling apparatuses, the transfer drum becomes contaminated, in particular due to airborne particles of the glue attaching to the label retaining segments. Concurrently, with time, this leads to a reduction of the overall quality of the labeling process which is usually tolerable only up to defined limits. For example, the presence of contaminants on the label retaining segments may lead to friction and drag effects causing distortion and breakage of some or even all labels. Thus, at some point during the labeling process, the labeling process generally needs to be interrupted in order to manually clean the transfer drum by an operator. Typically, the labeling process must be interrupted every 20 to 30 minutes for a time range between two to five minutes for carrying out the needed cleaning of the transfer drum.

EP-A-2818424 generally relates to a method of cleaning such transfer drums in which the labeling apparatus further comprises a cleaning roller arranged peripherally adjacent to the transfer drum. The cleaning roller may move between an operative configuration at which the cleaning roller may establish a mechanical contact with the outer surface of the transfer drum for cleaning the outer surface and a rest position at which the cleaning roller may be detached from the outer surface. During labeling, the cleaning roller may be controlled into its rest position so as not to interfere with the labeling process. When the labeling process needs to be interrupted for subjecting the transfer drum to a cleaning cycle, the cleaning roller may be controlled into the operative position to clean the outer surface by mechanical action of the cleaning roller.

However, further improvements of the operation of the labeling apparatus by further reducing the downtimes coming along with the required cleaning of the transfer drum may be desired.

SUMMARY

Embodiments of the present disclosure may provide a labeling apparatus and a method to operate a labeling apparatus that further improve the operation of such a labeling apparatus, in particular, the cleaning of the labeling apparatus.

Embodiments of the present disclosure may further provide a labeling apparatus and a method of operating such a labeling apparatus to reduce the production downtimes due to the cleaning of the labeling apparatus.

BRIEF DESCRIPTION OF THE DRAWINGS

Two non-limiting embodiments of the present disclosure will be described by way of example with reference to the accompanying drawings.

DETAILED DESCRIPTION

Figure 1:
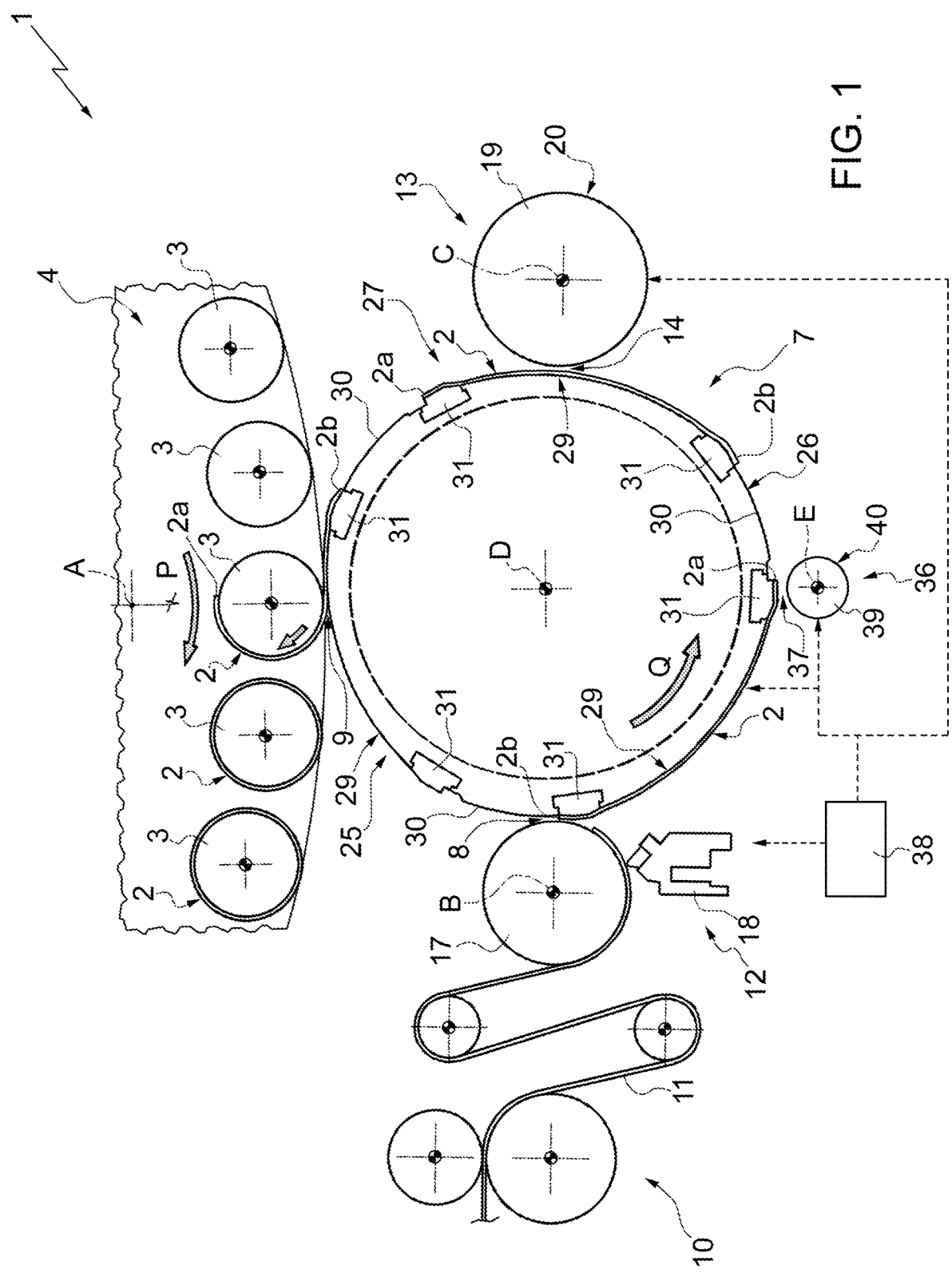
FIG. 1 is a schematic top view of a labeling apparatus, with parts removed for clarity.

Number 1 in FIG. 1 indicates, as a whole, a labeling apparatus only partially shown to the extent that is necessary for the comprehension of the present embodiment.

Apparatus 1 may be adapted to be used for handling, transferring and applying labels 2 to respective articles 3 or, more specifically, receptacles, bottles, containers or the like, as said articles 3 are advanced along an article path P. Articles 3 may be adapted to receive pourable products, in particular pourable food products such as such as carbonated liquids (e.g., sparkling water, soft drinks and beer), non-carbonated liquids (including still water, juices, teas, sport drinks, liquid cleaners, wine, etc.), emulsions, suspensions, high viscosity liquids and beverages containing pulps.

As further depicted in FIG. 1, apparatus 1 comprises a carrousel 4 configured to support a plurality of articles 3 on its periphery and to rotate the same along path P around an axis A of carrousel 4 itself. For example, carrousel 4 may be configured to receive unlabelled articles 3 from a first handling machine (not shown) and to deliver labeled articles 3 to a second handling machine (not shown). Accordingly, the first handling machine may be configured to feed articles 3, in particular unlabeled articles 3, to apparatus 1, and apparatus 1 may be configured to feed articles 3, in particular labeled articles 3, to the second handling machine.

Axis A may extend vertically, and the path P may be arc-shaped and extend horizontally.

Articles 3 may be rotated as they are advanced along the path P by carrousel 4 and as labels 2 are applied to the articles 3 themselves.

Apparatus 1 may further comprise:
a transfer device 7 configured to transfer a succession of labels 2 from a receiving station 8 to a label application station 9, at which labels 2 are applied onto respective receptacles 3, along a label path Q tangential to path P at label application station 9 itself;
a feeding unit 10 for feeding a web 11 of labeling material to receiving station 8;
a cutting unit 12 arranged adjacent to receiving station 8 for cutting off the succession of labels 2 from web 11; and
a glue application unit 13 arranged adjacent to at least a portion of transfer device 7 and between receiving and label application stations 8 and 9 and configured to apply, at a glue application station 14, a given amount of glue on the back side of each label 2 advancing along the path Q prior to reaching label application station 9.

In some embodiments, apparatus 1 may also comprise a support assembly 15 for carrying transfer device 7, feeding unit 10, cutting unit 12 and glue application unit 13.

For example, feeding unit 10 may comprise a magazine (not shown) comprising at least a main and an auxiliary bobbin, each one carrying a web of labeling material. In use, web 11 may be fed from the main bobbin until exhaustion of web 11 carried by the main bobbin. Prior to exhaustion of web 11 carried by the main bobbin, a splicing process may be activated so as to continuously feed web 11 from unit 10 to unit 12. For example, after exhaustion of web 11 carried by the main bobbin, web 11 may be fed from the auxiliary bobbin. By way of further example, during the splicing process, a beginning portion of web 11 carried by the auxiliary bobbin may be conjoined with an end portion of web 11 carried by the main bobbin.

In some embodiments, cutting unit 12 may comprise:
a rotary cutting drum 17, having an axis B parallel to axis A, arranged adjacent to at least a portion of transfer device 7 and carrying, on its outer lateral surface, the web 11; and
a stationary cutter blade or cutter 18 carried in a fixed position on one side of rotary cutting drum 17 and proximal to receiving station 8 so as to cooperate, in use, with the rotary cutting drum 17 to cut one label 2 at a time from web 11. For example, cutting unit 12 may be adapted to cut labels 2 of given lengths, each having a leading edge 2a and a trailing edge 2b.

Figure 2:
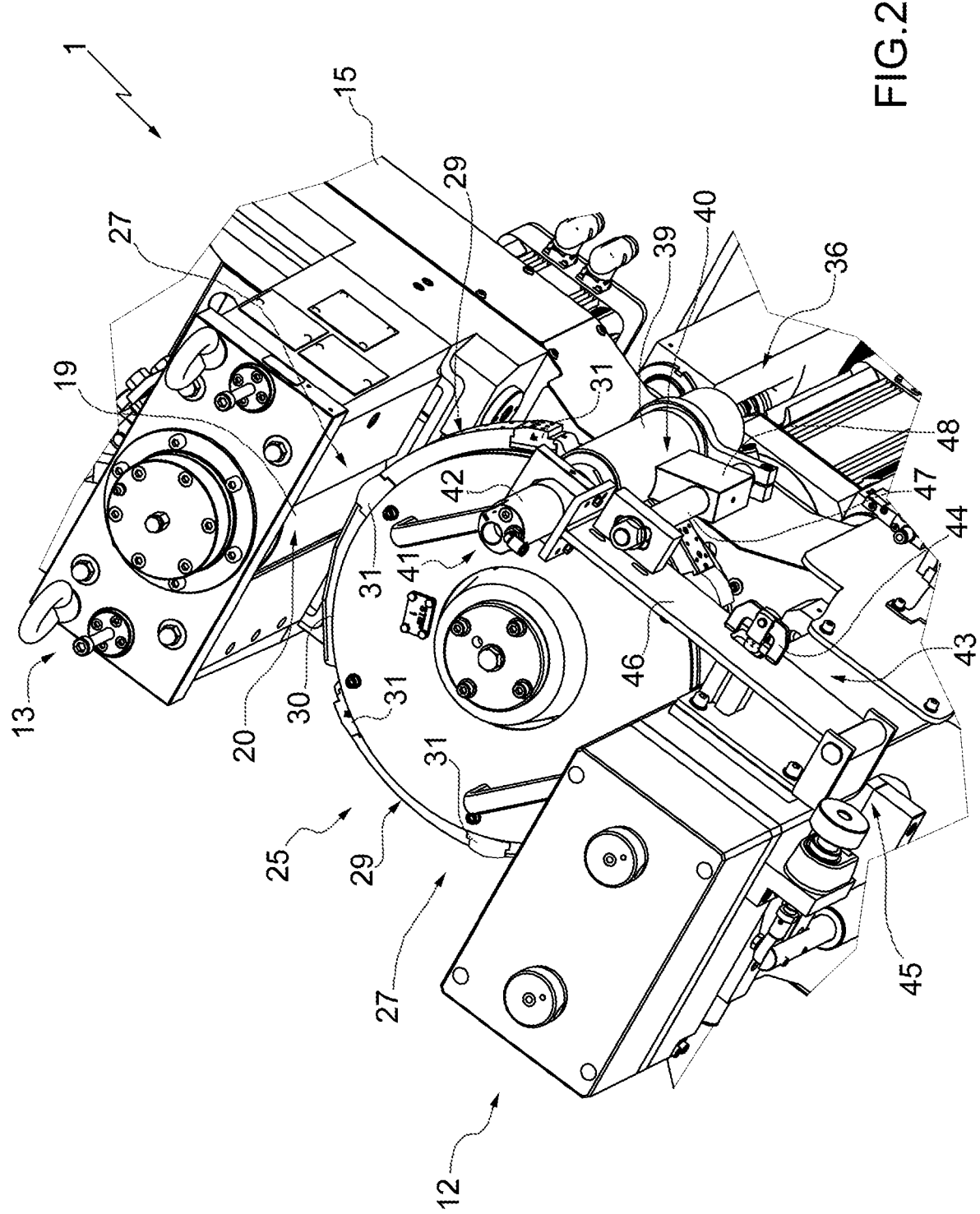
FIG. 2 is a perspective top-side view of a detail of FIG. 1, with parts removed for clarity.
Figure 3:
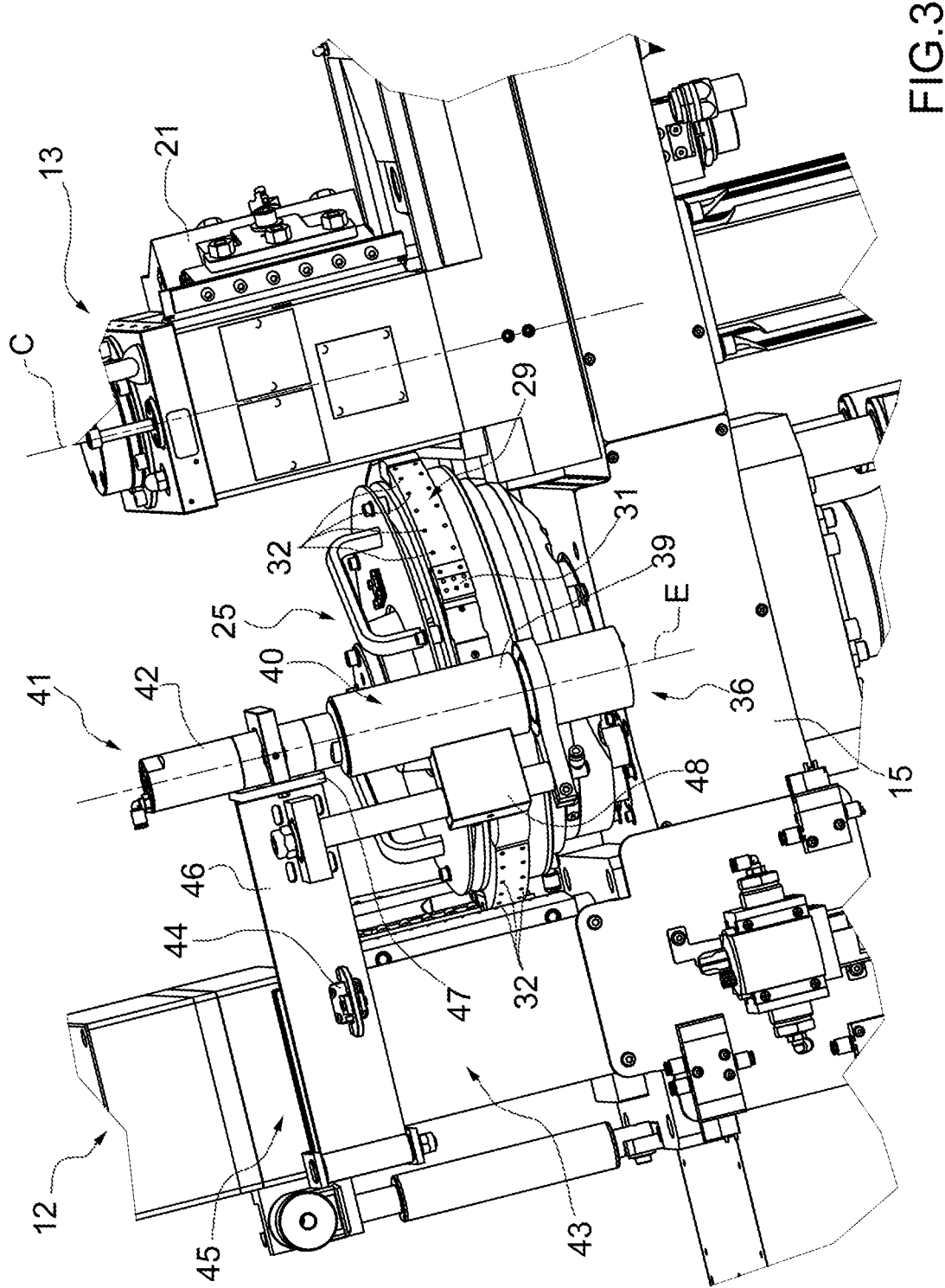
FIG. 3 is a perspective side view of the same detail of FIG. 1 as shown in FIG. 2, with parts removed for clarity.

In the embodiments depicted in FIGS. 1 to 3, glue application unit 13 may comprise a glue application roller 19 having an axis C substantially parallel to axes A and B.

For example, glue application roller 19 may be arranged adjacent to station 14 and may be configured to rotate about its axis C. In some embodiments, roller 19 may have an outer cylindrical lateral surface 20, which, in use, may be covered by melted glue continuously fed by a glue feeding system 21 (only partially shown to the extent necessary for the comprehension of the present embodiment) of glue application unit 13.

Glue application roller 19 may further be adapted to spread a pattern of glue at station 14 onto the backside of each label 2 advancing along path Q. For example, the pattern may be provided on the side of the label 2 designed to be stuck to the surface of one respective article 3 (i.e., glue is applied on the backside of label 2).

In the embodiments depicted in FIGS. 1 to 3, transfer device 7 may comprise a transfer drum 25 rotatable around a central axis D. For example, axis D may be parallel to axes A, B and C. Drum 25 may be adapted to retain labels 2 on its outer lateral surface 26 during advancement of labels 2 along path Q. For example, in use, during the labeling process, transfer drum 25 may rotate at a nominal working speed for attaching labels 2 to articles 3. In use, the nominal working speed may be set so as to allow for a labeling of about 500 to 1000 articles per minute.

In some embodiments, transfer drum 25 may be arranged peripherally adjacent, e.g. tangential, to glue application unit 13. In certain aspects, transfer drum 25 may be arranged peripherally adjacent to glue application roller 19 at glue application station 14. In some embodiments, transfer drum 25 may also be arranged peripherally adjacent, e.g. tangential, to rotary cutting drum 17 at receiving station 8, and to carousel 4 at label application station 9.

In some embodiments, rotation of transfer drum 25 around axis D may define path Q of labels 2, which may follow an arc-shaped profile. For example, transfer drum 25 may be configured to retain labels 2 on its outer lateral surface 26 and to advance these labels 2 from receiving station 8 to label application station 9 through glue application station 14 along path Q.

In some embodiments, transfer drum 25 may comprise a plurality of label retaining segments 27. In the example depicted in FIGS. 1 to 3, transfer drum 25 comprises three label retaining segments 27. In some embodiments, each label retaining segment may be adapted to receive at least one respective label 2 at receiving station 8 and to retain the respective label 2 during advancement of label 2. For example, each label retaining segment may be adapted to retain label 2 from station 8 to station 9 through station 14 along path Q. In some embodiments, label retaining segments 27 may at least partially define outer lateral surface 26. In certain aspects, segments 27 may be mounted along a peripheral portion of transfer drum 25. For example, segments 27 may be equally spaced angularly around axis D of transfer drum 25.

Each segment 27 may comprise:

a retaining section 29 adapted to retain labels 2 during advancement of labels 2 along at least a portion of path Q; and a transition section 30 adapted to permit labels 2, e.g. being fed from unit 12 to transfer drum 25, to slide along transition section 30 itself, prior to being retained by the retaining section 29; in some embodiments, each transition section 30 may extend between two respective retaining sections 29.

In some embodiments, each segment 27, e.g. the respective retaining section 29, may comprise a pair of pad assemblies 31 adapted to interact with labels 2. In the example depicted in FIGS. 1 to 3, transfer drum 25 comprises six pad assemblies 31. In certain aspects, each pair of pad assemblies 31 of each segment 27 delimits the respective retaining section 29.

In some embodiments, pad assemblies 31 may be mounted along the peripheral portion of transfer drum 25 and protrude away from axis D.

In some embodiments, each pad assembly 31 may be adapted to interact with a respective leading edge 2a or a respective trailing edge 2b of one respective label 2 for retaining the respective label 2 during advancement of labels 2 along path Q. For example, one pad assembly 31 of each pair of pad assemblies 31 may be configured to interact with leading edge 2a of the respective label 2 and the other one with the respective trailing edge 2b such that glue is applied to labels 2 only in the proximity of the respective edges 2a and 2b.

In some embodiments, each segment 27, e.g. the respective sections 29 and 30, may comprise a plurality of suction holes 32 configured to selectively communicate with a suction source (not shown) for slidingly guiding and retaining labels 2 during advancement along path Q using suction.

With particular reference to FIGS. 2 and 3, apparatus 1 may further comprise:

a cleaning unit 36 adapted to clean transfer drum 25, e.g. surface 26, and arranged peripherally adjacent to transfer drum 25 at a cleaning station 37; for example, station 37 may be interposed between station 8 and station 14; and a control unit 38 adapted to control cleaning unit 36 into an operative configuration at which cleaning unit 36 is adapted to clean transfer drum 25 and a rest configuration at which the cleaning function of cleaning unit 36 is at least interrupted or turned off.

In some embodiments, control unit 38 may also be configured to control units 10, 12 and 13 and carousel 4.

In certain aspects, control unit 38 may be adapted to selectively activate cleaning unit 36 into at least any one of:

a partial cleaning configuration at which cleaning unit 36 is configured to partially clean segments 27; and a full cleaning configuration at which cleaning unit 36 is configured to fully clean segments 27.

For example, control unit 38 may be configured to set cleaning unit 36 in the operative configuration by activating the partial or full cleaning configuration.

Control unit 38 itself may be configured to be set, e.g. by an operator using, for example, a human-machine-interface (not shown), at least into an automatic mode in which control unit 38 may be configured to activate cleaning unit 36 into the partial or the full cleaning configuration as a function of the operational status of apparatus 1 or a manual mode in which the control unit 38 may be configured to activate cleaning unit 36 into the partial or the full cleaning configuration as a function of a specific, e.g. manually activated, trigger signal. For example, the trigger signal may be activated by an operator, e.g. using the human-machine-interface. In an alternative embodiment, control unit 38 may be configured to activate cleaning unit 36 only into the partial cleaning configuration or only into the full cleaning configuration as a function of a trigger signal with control unit 38 being set into the manual mode.

In some embodiments, in the automatic mode, control unit 38 may be configured to analyze the operational status of apparatus 1. In use, the operational status of apparatus 1 may vary depending on the function of the first handling machine and/or the second handling machine and/or of the function of components of apparatus 1 itself, e.g. feeding unit 10, cutting unit 12 and/or glue application unit 13.

In the partial cleaning configuration, cleaning unit 36 may be configured to clean transition sections 30. For example, the partial cleaning of retaining segments 27 may result in only sections 30 being cleaned; in other words, sections 30 are cleaned, and sections 29 are not cleaned. In the full cleaning configuration, cleaning unit 38 may be configured to clean retaining and transition sections 29 and 30. In certain aspects, in use, in the full cleaning configuration, pad assemblies 31 may also be cleaned.

In some embodiments, control unit 38 may be adapted to control cleaning unit 36 into the full cleaning configuration in cases when feeding of labels 2 to transfer drum 25 is interrupted and, accordingly, segments 27 do not retain any labels 2. Control unit 38 may be further configured to control cleaning unit 36 into the partial cleaning configuration in cases where labels 2 are retained by segments 27, e.g. retaining sections 29.

In some embodiments, control unit 38 may be further adapted to control the rotational speed of transfer drum 25. For example, control unit 38 may be adapted to control a reduction of the rotational speed of transfer drum 25 with respect to the nominal working speed when activating the partial or full cleaning configuration. Such a reduction may improve the quality and reliability of the partial or full cleaning of segments 27 with respect to an unvaried rotational speed. In addition, the reduction of the rotational speed may facilitate a selective cleaning of transition sections 30 and avoidance of interference with retaining sections 29 when control unit 38 controls, in use, cleaning unit 36 into the partial cleaning configuration. In certain aspects, control unit 38 may also be adapted to control units 10, 12 and 13 and carousel 4 for adjusting operation of these to the altered rotation speed of drum 25; accordingly, control unit 38 may be configured to alter the overall labeling process.

Alternatively or additionally, control unit 38 may be configured to activate the partial or full cleaning configuration when, in use, the rotational speed of transfer drum 25 is reduced with respect to the nominal working speed, e.g. as a consequence of the operational status of apparatus 1.

Control unit 38 may be configured to control the rotational speed to a cleaning speed. For example, the cleaning speed may be such that apparatus 1 is adapted to label about 80 to 120 articles per minute or, in the case no labels 2 are fed to transfer drum 25, the rotational speed may correspond to a speed at which about 80 to 120 articles per minute would be labeled. Alternatively or additionally, control unit 38 may be adapted to activate the partial or full cleaning configuration if the rotational speed of transfer drum 25 is reduced to the cleaning speed.

In some embodiments, cleaning unit 38 may comprise a cleaning roller 39 arranged peripherally adjacent to transfer drum 25 at station 37 and adapted to rotate around a rotation axis E. For example, axis E may be parallel to axis D. In certain aspects, cleaning roller 39 may be adapted to move between an operative position (see, for example, FIGS. 2 and 3) at which roller 39 is configured to clean, at least partially, segments 27 and at least one rest position (see, for example, FIG. 1) at which roller 39 is disabled from cleaning segments 27. For example, at the operative position, roller 39 may be adapted to establish mechanical contact with segments 27, e.g. with retaining sections 29 and transition sections 30. By way of further example, at the rest position, roller 39 may be detached from segments 27, e.g. from retaining sections 29 and transition sections 30.

In some embodiments, the operational configuration of cleaning unit 36 may be defined by roller 39 being at its operative position, and the rest configuration of cleaning unit 36 may be defined by roller 39 being at its rest position.

In certain aspects, cleaning roller 39 may comprise a sponge-like outer surface 40 adapted to receive and absorb a cleaning agent. Alternatively or additionally, cleaning roller 39 may comprise a brush-like surface structure.

In some embodiments, cleaning unit 36 may comprise a driving assembly 41 adapted to actuate rotation of cleaning roller around axis E.

Driving assembly 41 may comprise an electrical motor 42 coupled to roller 39 and adapted to drive roller 39. For example, motor 42 may be configured to rotate roller 39 in such a manner that the surface speed of surface 40 is lower than the surface speed of surface 26.

In some embodiments, cleaning unit 36 may further comprise an actuation assembly 43 adapted to move roller 39 between the operative position and the rest position.

For example, actuation assembly 43 may be adapted to continuously move, e.g. to oscillate, roller 39 between the operational position and the rest position, for example, with cleaning unit 36 being controlled in its partial cleaning configuration. Control unit 38 may be adapted to control assembly 43 such that assembly 43 moves roller 39 between the operative and the rest position.

Control unit 38 may be configured to control actuation assembly 43 such that actuation assembly 43 continuously moves roller 39 between the operative and the rest position when controlling cleaning unit 36 into the partial cleaning configuration. For example, in use, when cleaning unit 36 is controlled in the partial cleaning configuration, actuation assembly 43 may be configured to move roller 39 into the operative position so as to contact transition section 30 and to move roller 39 into the rest position to avoid contact between roller 39 and retaining sections 29. Accordingly, in the partial cleaning configuration, actuation assembly 43 may be adapted to continuously move (e.g. to oscillate) roller 39 between the operative and the rest position so as to clean transition sections 30 and to avoid interference with retaining sections 29. For example, the frequency of oscillation may be controlled to establish contact of roller 39 with transition sections 30 and to detach roller 39 from retaining sections 29.

In some embodiments, actuation assembly 43 may comprise at least one actuation element 44. In the example depicted, actuation assembly 43 comprises one actuation element 44. In certain aspects, the at least one actuation element may be configured to move between an extracted configuration (not shown) and a retracted configuration (shown, for example, in FIGS. 2 and 3) for setting roller 39 into the rest position or the operative position. In the particular example shown, actuation element 44 is designed to set the roller 39 into the operative position by being in the retracted configuration and to set the roller 39 into the rest configuration by being in the extracted configuration.

In some embodiments, actuation element 44 may be a linear actuator, e.g. of the electrical type. Alternatively or additionally, actuation element 44 may be of the pneumatic or hydraulic type.

In some embodiments, actuation assembly 43 may also comprise a support structure 45 carrying roller 39 and, in certain aspects, also motor 42. Support structure 45 may be coupled to cutting unit 12.

In certain aspects, support structure 45 may comprise a main portion, for example, a support plate 46 hinged at a first end of support plate 46 and adapted to perform an angular movement and at least indirectly carrying at a second end of plate 46 opposite to the first end roller 39 and motor 42. Support structure 45 may also comprise a coupling structure 47 mounted to the second end of plate 46 and carrying roller 39 and motor 42.

In some embodiments, actuation element 44 may be configured to cooperate with plate 46 for moving roller 39 between its operative position and its rest position. For example, actuation element 44 may be coupled to cutting unit 12 and to an intermediate portion of plate 46 and may be adapted to actuate the angular movement of plate 46. Accordingly, in use, as roller 39 is indirectly carried by plate 46 through coupling structure 47, the angular movement of plate 46 may lead to movement of roller 39, e.g. for moving roller 39 between the operative position and the rest position.

As depicted in FIGS. 2 and 3, cleaning unit 36 may further comprise a dispensing assembly 48 adapted to apply a cleaning agent onto roller 39, e.g. onto surface 40.

For example, dispensing assembly 48 may be arranged in the proximity of roller 39, and dispensing assembly 48 may be carried by support structure 45, e.g. by coupling structure 47.

In use, prior to or during operation of apparatus 1, an operator may set control unit 38 into the automatic mode or the manual mode for defining whether cleaning of transfer drum 25 is to be activated by control unit 38 automatically, based on the operational status of apparatus 1 itself or based on a trigger signal actuated by the operator himself.

In the following example, the operator has set the control unit 38 into the automatic mode.

In this example, feeding unit 10 feeds web 11 to cutting unit 12, which cuts single labels 2 from web 11. Labels 2 are transferred at station 8 to transfer device 7. In this particular example, labels 2 are transferred to transfer drum 25, which rotates around axis D. For example, each label 2 is transferred at station 8 to one respective segment 27 so as to advance label 2 along path Q through stations 14 and 9. In this example, each label 2 is transferred at station 8 to the respective transfer section 30, which slidingly guides label 2 to the respective retaining section 29.

In this same example, a pattern of glue is applied to each label 2 advancing along path Q at station 14, and labels 2 are attached to articles 3 advancing along path P at station 9.

During the overall labeling process control unit 38 may selectively activate cleaning unit 36 into at least any one of:

a partial cleaning configuration at which cleaning unit 36 partially cleans segments 27; and a full cleaning configuration at which cleaning unit 36 fully cleans segments 27.

For example, control unit 38 may monitor the operational status of apparatus 1 and activate cleaning unit 36 into the partial or the full cleaning configuration depending on the operational status.

In a further example, control unit 38 may control cleaning unit 36 into the full cleaning configuration when the feeding of labels 2 to station 8 is interrupted. In typical operation of apparatus 1, a succession of articles 3 devoid of any gaps may be fed to apparatus 1, e.g. to carrousel 4, such that this succession of articles 3 advances along path P. However, in practice, gaps are often present in the succession of articles 3 (e.g. due to errors or due to the specific operation of the first handling machine). In addition, the feeding of articles 3 may often be interrupted, for example, due to possible problems of the first or the second handling machine. In these cases, particularly when the gap is sufficiently large, the operational status of apparatus 1 may be altered. For example, the labeling process may be interrupted as no articles 3 are delivered to carrousel 4. By way of further example, the feeding of labels 2 to transfer drum 25 at station 8 may be interrupted. Furthermore, the feeding of glue onto surface 20 of roller 19 may be interrupted.

In some embodiments, in the full cleaning configuration, control unit 38 may control roller 39 into the operative position to contact segments 27 and to fully clean segments 27, e.g. retaining and transition sections 29 and 30. For example, control unit may control actuation assembly 43 for moving the roller 39 from its rest position to its operative position. By way of further example, actuation element 44 may be controlled from the extracted configuration to the retracted configuration to move roller 39 from its rest position to its operative position.

In certain aspects, the rotational speed of transfer drum 25 may be reduced with respect to the nominal working speed, e.g. the speed may equal the cleaning speed.

In some embodiments, rotation of roller 39 may be actuated by activating driving assembly 41. Dispensing assembly 48 may apply the cleaning agent onto surface 40.

In some embodiments, control unit 38 may control cleaning unit 36 into the partial cleaning configuration in case of an additional typical change in the operational status of apparatus 1, e.g. due to the need to activate a splicing process within feeding unit 10. For example, the splicing process may be required to guarantee continuous feeding of web 11 to cutting unit 12. At some point off the overall labeling process, an exhaustion of web 11 carried by the main bobbin generally occurs. Then, during the splicing process, the initial portion of web 11 carried by the auxiliary bobbin may be conjoined with the final portions of web carried by the main bobbin. During the splicing process, the overall labeling process may be slowed down. For example, the feeding of labels 2 to transfer drum 25 may be slowed down, and, concurrently, the rotational speed of transfer drum 25 may be reduced with respect to the nominal working speed, e.g. the speed may equal the cleaning speed. During the splicing process, labels 2 may still be fed to station 8 such that, during rotation of transfer drum 25, each segment 27 may retain one respective label 2 during advancement of the respective label 2 from station 8 to station 9. In this example, retaining section 29 may retain one respective label 2 during advancement of label 2 from station 8 to station 9 through stations 37 and 14. Accordingly, retaining section 29 generally cannot be subjected to a cleaning at station 37. Thus, control unit 38 may be configured to activate cleaning unit 36 into the partial cleaning configuration such that only transition sections 30 are subjected to a cleaning, which may be devoid of any portion of labels 2 at station 37. Roller 39 may continuously move between the rest position and the operative position so as to clean solely transition sections 30. For example, the frequency may be controlled such that roller 39 is positioned in the operative position to establish contact with the transition sections 30, and roller 39 is positioned in the rest position to avoid contact with retaining sections 29.

For example, control unit 38 may control actuation assembly 43 such that roller 39 continuously moves between the rest position and the operative position.

By way of further example, actuation element 44 may oscillate between the retracted configuration and the extracted configuration, for example, at a frequency which guarantees cleaning of transition sections 30 by roller 39 and which avoids contact of roller 39 with retaining sections 29.

In some embodiments, rotation of roller 39 may be actuated by activating driving assembly 41, e.g. during the complete activation of the partial cleaning mode. Dispensing assembly 48 applies the cleaning agent onto surface 40.

In an example in which the operator has set the control unit 38 into the manual mode, the control unit may activate the partial or full cleaning configuration only based on the specific, e.g. manually activated, trigger signal, which may be activated by the operator himself.

Setting the control unit 38 into the manual mode may be advantageous in cases in which the operation of the first handling machine inherently results in a plurality of successions of articles 3 being fed to the labeling apparatus 1 with the successions being divided by gaps of a defined size which would trigger the activation of the partial cleaning configuration or the activation of the full cleaning configuration when control unit 38 is set in the automatic mode. In these cases, cleaning of transfer drum 25 would often be activated more than necessary, which may lead to increased consumption of cleaning agent.

In the manual mode, the operator may trigger control unit 38 to activate the partial or the full cleaning configuration of cleaning unit 36, as described above.

When activating the partial or full cleaning configuration, control unit 38 may control a reduction of the rotational speed of transfer drum 25 with respect to the nominal working speed. For example, control unit may control rotation of transfer drum 25 to the cleaning speed. In certain aspects, control unit 38 may also control units 10, 12 and 13 and carousel 4 to adapt the speed of feeding labels 2 to station 8, the gluing process and the speed of advancement of articles 3 along path P.

The manual mode may be set such that control unit 38 activates the partial or full cleaning configuration prior to or after the overall labeling process. In these aspects, control unit 38 may control rotation of transfer drum 25.

Figure 4:
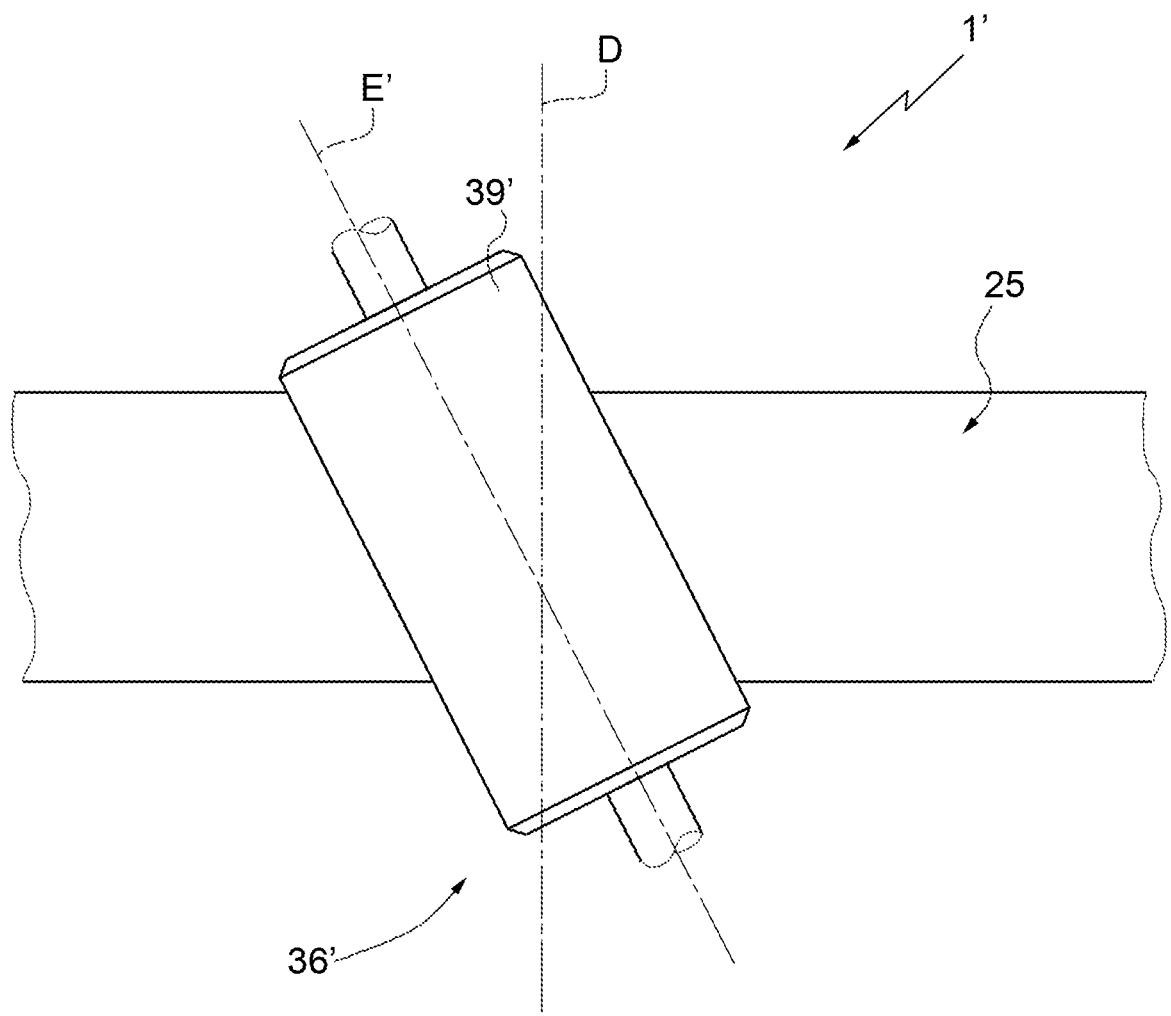
FIG. 4 is a side view of a detail of a further embodiment of the labeling apparatus of FIG. 1, with parts removed for clarity.

In FIG. 4, number 1' indicates an alternative embodiment of a glue application apparatus (only partially shown to the extent necessary for the comprehension of the alternative embodiment). As apparatus 1' is similar to apparatus 1, the following description is limited to the differences between them and uses the same references, where possible, for identical or corresponding parts.

In certain aspects, apparatus 1' differs from apparatus 1 in comprising cleaning unit 36'.

As cleaning unit 36' is similar to cleaning unit 36, the following description is limited to the differences between them and uses the same references, where possible, for identical or corresponding parts.

For example, cleaning unit 36' differs from cleaning unit 36 in comprising cleaning roller 39' having a rotation axis E'. Axis E' may be inclined with respect to axis D of transfer drum 25 (e.g. axis D and E' may deviate from being parallel). For example, axis E' may be inclined in a tangential direction to surface 26. By way of further example, axis D may lie within a first plane, and axis E' may lie within a second plane distinct from and parallel to the first plane.

In certain aspects, in use, rotation of roller 39' may be actuated passively through interaction with rotating transfer drum 25, for example, due to the contact friction between sponge-like outer surface 40' of roller 39' and surface 26, e.g. when roller 39' is set at its operative position.

As the function of apparatus 1' is similar to apparatus 1, the following description is limited to the differences between the functions of apparatuses 1 and 1'. For example, a difference lies in roller 39' rotating around its axis E' due to interaction with transfer drum 25, e.g. surface 26, when being in its operative position.

Apparatus 1 may provide for flexible means of cleaning transfer drum 25 and may reduce downtimes due to cleaning transfer drum 25. Apparatus 1 may further allow for cleaning of transfer drum 25 depending on the operational status of apparatus 1 itself, e.g. performing the cleaning during the labeling process. Therefore, the overall labeling process often does not need, or at least only rarely needs, to be interrupted for cleaning drum 25.

Furthermore, cleaning unit 36 may be operated in a full cleaning configuration or a partial cleaning configuration. The partial cleaning configuration may allow for cleaning transition sections 30, which typically are contaminated more quickly than retaining sections 29.

In addition, during the overall labeling process, a splicing process generally needs to be activated regularly, such that the partial cleaning configuration need not require any particular interruption or alteration of the labeling process itself, but instead may use the alteration itself.

Moreover, the cleaning unit 36 may be controlled into its full cleaning configuration when transfer drum 25 is not receiving labels 2 at station 8. Accordingly, no interruption of the labeling process need be done solely for cleaning transfer drum 25.

In addition, the cleaning unit 36 may be set into the automatic mode and the manual mode, which may further increase the flexibility of apparatus 1. Setting the control unit 38 into the manual mode may allow for reducing the consumption of the cleaning agent, e.g. in situations in which control unit 38 would activate the partial or full cleaning configuration of the cleaning unit 36 more often than necessary.

Changes may be made to apparatus 1 and/or the method of operating apparatus 1 as described herein without departing from the scope of protection as defined in the accompanying claims.

In an alternative embodiment not shown, cleaning unit 36 may comprise a laser device instead of cleaning roller 39, the laser device being adapted to clean transfer drum 25. In such an alternative embodiment, control unit 38 may turn the laser device on or off in order to set the cleaning unit into an operative configuration or a rest configuration.

In an additional alternative embodiment not shown, control unit 38 may comprise an analyzing group adapted to determine the time lapsed since the last cleaning of transfer drum 25. In such an embodiment, control unit 38 may be adapted to skip activation of the full or partial cleaning configuration if the time lapsed is below a predetermined time limit.

In a further aspect, control unit 38 may be adapted to activate the partial or the full cleaning configuration of cleaning unit 36 if the time lapsed since the last cleaning of transfer drum 25 is above a predefined time limit. Control unit 38 may also be adapted to control operation of units 10, 12 and 13 and carousel 4, accordingly.

In a further alternative embodiment not shown, actuation assembly 43 may be adapted to move roller 39 or roller 39' between the operative position, a main rest position and one or more intermediate rest positions interposed between the operative position and the main rest position. In such an embodiment, control unit 38 may control the roller 39 or roller 39' between the intermediate rest position and the operative position when operating cleaning unit 36 in the partial cleaning configuration at which roller 39 or roller 39' performs an oscillating movement.

In a further alternative embodiment not shown, cleaning unit 36' may comprise a driving assembly similar to driving assembly 41 for actively actuating rotation of roller 39'.

In a further alternative embodiment not shown, actuation assembly 43 may comprise cam means instead of actuation element 44. In such an embodiment, the cam means may be adapted to move roller 39 or 39' between the rest position and the operative position. The cam means may be designed to change between a first and a second configuration so as to be configured to be adapted to the partial and full cleaning configuration of cleaning unit 36 or 36'.

In another alternative embodiment not shown, the glue application unit 13 of labeling apparatus 1 may comprise a glue application nozzle or a plurality of glue application nozzles and a respective glue feeding system instead of roller 19 and glue feeding system 21. In such an embodiment, the glue application nozzle or the plurality of glue application nozzles may apply a pattern of glue onto labels 2 in a contact-free manner.

The invention claimed is:

1. A labeling apparatus for labeling articles, comprising:
 a transfer drum having at least one label retaining segment comprising a retaining section to retain the at least one label and a transition section to receive the at least one label and to slidingly guide the at least one label to the retaining section, the transfer drum being adapted to convey the at least one label along a path defined by rotation of the transfer drum around a central axis of the transfer drum;
 a glue applicator adapted to apply glue onto the at least one label at a glue application station, the glue applicator being arranged adjacent to the transfer drum at the glue application station;
 a cleaning device adapted to clean the transfer drum; and
 a controller adapted to selectively activate the cleaning device into a partial cleaning configuration in which the cleaning device is configured to clean the transition section of the label retaining segment and not the retaining section, wherein the controller is further adapted to control a reduction of a rotational speed of the transfer drum with respect to a nominal working speed of the transfer drum when activating the cleaning device into the partial cleaning configuration;

the cleaning device comprises a cleaning roller adapted to rotate around a rotation axis and to clean partially or fully the at least one label retaining segment and is further adapted to move between an operative position in which the cleaning roller is designed to clean at least partially the at least one label retaining segment and at least one rest position in which the cleaning roller is disabled from cleaning the at least one label retaining segment;

wherein the cleaning device further comprises an actuation assembly adapted to move the cleaning roller between the operative position and the at least one rest position, and wherein the controller is adapted to control the actuation assembly, in the partial cleaning configuration, such that the actuation assembly continuously moves the cleaning roller between the operative position and the at least one rest position.

2. The labeling apparatus according to claim 1, wherein the controller is configured to be set into at least one of an automatic mode in which the controller is adapted to activate the cleaning device into the partial cleaning configuration as a function of an operational status of the labeling apparatus or a manual mode in which the controller is adapted to activate the cleaning device into the partial cleaning configuration or the as a function of a trigger signal.

3. The labeling apparatus according to claim 1, wherein the controller is further adapted to activate the partial cleaning configuration when the rotational speed of the transfer drum is reduced with respect to the nominal working speed.

4. The labeling apparatus according to claim 1, wherein the cleaning device further comprises a driving assembly adapted to actuate rotation of the cleaning roller around the rotation axis.

5. The labeling apparatus according to claim 1, wherein the rotation axis is inclined with respect to the central axis.

6. The labeling apparatus according to claim 1, wherein the cleaning device further comprises a dispenser adapted to apply a cleaning agent onto the cleaning roller.

7. The labeling apparatus according to claim 6, wherein the cleaning roller comprises a sponge-like outer surface adapted to absorb the cleaning agent applied by the dispensing assembly.

8. The labeling apparatus according to claim 1, wherein the controller is further adapted to activate the cleaning device into a full cleaning configuration in which the cleaning device is configured to clean the retaining section and transition section of the label retaining segment.

9. The labeling apparatus according to claim 8, wherein the controller is configured to be set into at least one of an automatic mode in which the controller is adapted to activate the cleaning device into the full cleaning configuration as a function of an operational status of the labeling apparatus or a manual mode in which the controller is adapted to activate the cleaning device into the full cleaning configuration as a function of a trigger signal.

10. A method of operating a labeling apparatus, wherein the labeling apparatus has a transfer drum having at least one label retaining segment comprising a retaining section to retain the at least one label and a transition section to receive the at least one label and to slidingly guide the at least one label to the retaining section, a glue applicator, a cleaning device, and a controller; and the method comprising:

selectively activating the cleaning device into a partial cleaning configuration in which the cleaning device is configured to clean the transition section of the label retaining segment and not the retaining section, wherein the controller is further adapted to control a reduction of a rotational speed of the transfer drum with respect to a nominal working speed of the transfer drum when activating the cleaning device into the partial cleaning configuration;

the cleaning device comprises a cleaning roller adapted to rotate around a rotation axis and to clean partially or fully the at least one label retaining segment and is further adapted to move between an operative position in which the cleaning roller is designed to clean at least partially the at least one label retaining segment and at least one rest position in which the cleaning roller is disabled from cleaning the at least one label retaining segment;

wherein the cleaning device further comprises an actuation assembly adapted to move the cleaning roller between the operative position and the at least one rest position, and wherein the controller is adapted to control the actuation assembly, in the partial cleaning configuration, such that the actuation assembly continuously moves the cleaning roller between the operative position and the at least one rest position.

11. The method according to claim 10, further comprising setting the controller into at least one of an automatic mode in which the controller activates the cleaning device into the partial cleaning configuration as a function of an operational status of the labeling apparatus or a manual mode in which the controller activates the cleaning device into the partial cleaning configuration as a function of a trigger signal.

12. The method according the claim 10, further comprising actuating rotation of the cleaning roller when activating the cleaning device in the partial cleaning configuration.

13. The method according to claim 10, further comprising applying a cleaning agent onto the cleaning roller.

14. The method according to claim 10, further comprising activating the partial cleaning configuration when a rotational speed of the transfer drum is reduced with respect to a nominal working speed.

15. The method according to claim 10, wherein the controller is further adapted to activate the cleaning device into a full cleaning configuration in which the cleaning device is configured to clean the retaining section and transition section of the label retaining segment.

16. The method according to claim 15, further comprising setting the controller into at least one of an automatic mode in which the controller activates the cleaning device into the full cleaning configuration as a function of an operational status of the labeling apparatus or a manual mode in which the controller activates the cleaning device into the full cleaning configuration as a function of a trigger signal.

\* \* \* \* \*